(12) United States Patent
Kobayashi

(10) Patent No.: US 7,783,175 B2
(45) Date of Patent: Aug. 24, 2010

(54) LIQUID HEAT-COOKING DEVICE

(75) Inventor: Toshihiro Kobayashi, Nagoya (JP)

(73) Assignee: Paloma Industries, Limited, Nagoya-Shi (JP)

( * ) Notice: Subject to any disclaimer, the term of this patent is extended or adjusted under 35 U.S.C. 154(b) by 589 days.

(21) Appl. No.: 11/742,686

(22) Filed: May 1, 2007

(65) Prior Publication Data
US 2007/0263993 A1 Nov. 15, 2007

(30) Foreign Application Priority Data
May 9, 2006 (JP) .............................. 2006-129938

(51) Int. Cl.
*F24C 1/00* (2006.01)
*A21B 3/13* (2006.01)
(52) U.S. Cl. ........................................ 392/308; 99/324
(58) Field of Classification Search ................. 392/308, 392/301–310, 441–465; 99/323–421
See application file for complete search history.

(56) References Cited

U.S. PATENT DOCUMENTS 4,979,435 A * 12/1990 Hayashi et al. ............... 99/334
5,029,520 A * 7/1991 Okada ........................ 99/357
5,186,097 A     2/1993 Vaseloff et al.
5,228,382 A * 7/1993 Hayashi et al. ............... 99/328
5,997,924 A * 12/1999 Olander et al. .............. 426/296
2002/0108506 A1* 8/2002 Shimizu ....................... 99/486
2007/0263993 A1* 11/2007 Kobayashi ................... 392/308
2008/0163760 A1* 7/2008 Stettes ......................... 99/357

FOREIGN PATENT DOCUMENTS

EP          1 100 050 A1     5/2001
JP       2004-275431 A1    10/2004

* cited by examiner

*Primary Examiner*—Daniel Robinson
(74) *Attorney, Agent, or Firm*—Burr & Brown

(57) ABSTRACT

A fryer is set up in a cooking area of a restaurant or the like for use, and allows a standby temperature of cooking oil to be switched according to congestion of customers in a hall of the restaurant. The congestion of customers is evaluated by counting per unit time the count of an entrance switch when a customer enters the hall. When the count number per unit time is equal to or greater than a predetermined count, the oil temperature in a oil vessel of the fryer is set at a standby temperature T1 (degrees Celsius) allowing food materials to be quickly heated or fried. On the other hand, if the count is smaller than p1 times, the oil temperature is set at a standby temperature T2 (degrees Celsius) which is lower than the standby temperature T1 thereby conserving energy.

4 Claims, 7 Drawing Sheets

LIQUID HEAT-COOKING DEVICE

BACKGROUND OF THE INVENTION

This application claims the benefit of Japanese Patent Application Number 2006-129938 filed on May 9, 2006, the entirety of which is incorporated by reference.

FIELD OF THE INVENTION

The present invention relates to liquid heat-cooking devices. In detail, it relates to a liquid heat-cooking device, such as a fryer or a noodle boiling machine, capable of heating and cooking food materials with heated liquid, such as oil or water.

DESCRIPTION OF THE RELATED ART

Conventionally, a liquid heat-cooking device, such as a fryer, for use in a restaurant or the like includes: a cooking vessel that accommodates liquid, such as cooking oil; a heating means, such as a burner, that heats the cooking vessel; a temperature detecting means that detects the temperature of the liquid; and a control means that controls the heating means. The control means monitors the temperature of the liquid according to a cooking menu selected and operates the heating means so as to heat the liquid in the cooking vessel at a set temperature, and thus, food materials introduced in the cooking vessel can be heated and cooked.

Conventionally, a liquid heat-cooking device has been known, which includes a schedule setting means in which a cooking schedule, such as a start time or completion time of a predetermined cooking menu, is set for a predetermined period, such as determined on a by day or on a by week basis (for example, refer to the Japanese Patent Laid-Open Publication No. 2004-275431). In this liquid heat-cooking device, a heating means is operated by a control means based on the cooking schedule. In this case, when the heating means is not operated to perform heat cooking, the temperature of liquid is kept at a predetermined maintaining temperature set according to the length of the non-operating time. Thus, at the time of heat cooking in the cooking schedule, it is ensured that heat cooking can be always quickly started.

However, in the liquid heat-cooking device according to the Japanese Patent Laid-Open Publication No. 2004-275431, the maintaining temperature (standby temperature) of the liquid is changed based on the cooking schedule set by the schedule setting means. This poses a problem of a mismatch between the actual congestion of customers in the restaurant or the like and a time for heat cooking. Thus, for example, even if the actual congestion of customers becomes higher to cause the restaurant to be crowded, the liquid temperature may be kept low, thereby making it impossible to quickly handle orders from customers. Conversely, even if the restaurant is not so crowded after the actual congestion of customers has passed its peak, the liquid temperature may be kept high, thereby inviting waste of energy for the operation of the heating means.

The present invention has been devised to solve the above problems, and its object is to provide a liquid heat-cooking device capable of appropriately adjusting a standby temperature of the liquid according to customer congestion in a restaurant.

SUMMARY OF THE INVENTION

To achieve the above object, a liquid heat-cooking device of the invention according to a first aspect includes a cooking vessel that accommodates a liquid; a heating means that heats the liquid in the cooking vessel; a temperature detecting means that detects a temperature of the liquid; a customer-congestion detecting means that detects customer congestion in a predetermined area; a temperature setting means that sets a standby temperature of the liquid according to the detection result of the customer-congestion detecting means; and a heat controlling means that controls an operation of the heating means so that the liquid is at the standby temperature set by the temperature setting means, wherein the temperature setting means sets a first standby temperature when the detection result of the customer-congestion detecting means indicates a value equal to or greater than a predetermined value, and sets a second standby temperature lower than the first standby temperature when the detection result of the customer-congestion detecting means indicates a value smaller than the predetermined value.

Also, in a liquid heat-cooking device of the invention according to a second aspect, in addition to the structure of the invention according to the first aspect, the customer-congestion detecting means includes a press-count calculating means that detects a press of a switch for opening and closing a door at an entrance of the predetermined area that calculates the press count per unit time, and the temperature setting means sets the first standby temperature when the press count per the unit time calculated by the press-count calculating means is equal to or greater than a predetermined count, and sets the second standby temperature when the press count is smaller than the predetermined count.

Furthermore, in a liquid heat-cooking device of the invention according to a third aspect, in addition to the structure of the invention according to the first aspect, the customer-congestion detecting means includes an opening/closing-count calculating means that detects an opening/closing count of a door at an entrance of the predetermined area and calculates an opening/closing count of the door per unit time, and the temperature setting means sets the first standby temperature when the opening/closing count of the door per the unit time calculated by the opening/closing-count calculating means is equal to or greater than a predetermined count, and sets the second standby temperature when the opening/closing count is smaller than the predetermined count.

Still further, in a liquid heat-cooking device of the invention according to a fourth aspect, in addition to the structure of the invention according to the first aspect, the customer-congestion detecting means includes a head-count calculating means that detects the number of people passing through an entrance of the predetermined area and calculates the number of passing people per unit time, and the temperature setting means sets the first standby temperature when the number of passing people per the unit time calculated by the head-count calculating means is equal to or greater than a predetermined head count, and sets the second standby temperature when the number of passing people is smaller than the predetermined head count.

In the liquid heat-cooking device of the invention according to the first aspect, since the liquid in the cooking vessel is heated by the heating means, food materials introduced into the cooking vessel are heated and cooked. Then, the congestion of customers in the predetermined area is detected by the customer-congestion detecting means and, according to the detection result, the standby temperature of the liquid is set by the temperature setting means. Furthermore, the heat controlling means operates the heating means so that the liquid in the cooking vessel is at the set standby temperature. Thus, the temperature of the liquid in the cooking vessel can be adjusted according to the congestion of customers in the predetermined area. The standby temperature of the liquid is set, by the temperature setting means, at the first standby temperature when the detection result of the customer-congestion detecting means indicates a value equal to or greater than the predetermined value, and at the second standby temperature lower than the first standby temperature when the detection result indicates a value smaller than the predetermined value. Thus, for example, when the first standby temperature is set at a desired temperature allowing the food materials to be quickly heated, even if the detection result of the customer-congestion detecting means indicates a value equal to or greater than the predetermined value, the food materials can be heated and cooked according to the congestion of customers. Furthermore, when the detection result of the customer-congestion detecting means indicates a value smaller than the predetermined value, the second standby temperature lower than the first standby temperature is set, thereby saving energy required for the operation of the heating means. Here, the congestion of customers indicates a degree of congestion of customers in the predetermined area, and indirectly indicates a degree of crowdedness of people in the predetermined area.

Also, in the liquid heat-cooking device of the invention according to the second aspect, in addition to the effects of the invention according to the first aspect, when a customer enters the inside of the predetermined area, the customer presses the switch for opening and closing the door at an entrance of the predetermined area. Therefore, the press count of this switch is detected by the customer-congestion detecting means, and the press count per unit time is calculated by the press-count calculating means, thereby assuming the congestion of customers in the predetermined area. Furthermore, when the press count per unit time calculated by the press-count calculating means is equal to or greater than the predetermined count, the temperature setting means sets the first standby temperature. When the press count is smaller than the predetermined count, the temperature setting means sets the second standby temperature. For example, even if the press count per unit time is equal to or greater than the predetermined count, by setting the first standby temperature at a desired temperature that allows the food materials to be quickly heated, the food materials can be heated and cooked even with high a congestion of customers. Furthermore, when the press count per unit time is smaller than the predetermined count, the second standby temperature lower than the first standby temperature is set, thereby reducing the energy consumed by the heating means.

Furthermore, in the liquid heat-cooking device of the invention according to the third aspect, in addition to the effects of the invention according to the first aspect, when a customer enters the inside of the predetermined area, the door at the entrance is open and closed at least one time. Therefore, the customer-congestion detecting means detects an opening/closing count of this door and the opening/closing-count calculating means calculates an opening/closing count of the door per unit time, thereby assuming the congestion of customers in the predetermined area. Furthermore, when the opening/closing count of the door per unit time calculated by the opening/closing-count calculating means is equal to or greater than the predetermined count, the first standby temperature is set. When the opening/closing count is smaller than the predetermined count, the second standby temperature is set. For example, even if the opening/closing count of the door per unit time is equal to or greater than the predetermined count, by setting the first standby temperature at a desired temperature that allows the food materials to be quickly heated, the food materials can be heated and cooked even with a high congestion of customers. Furthermore, when the opening/closing count of the door per unit time is smaller than the predetermined count, the second standby temperature lower than the first standby temperature is set, thereby reducing the energy consumed by the operation of the heating means.

Still further, in the liquid heat-cooking device of the invention according to the fourth aspect, in addition to the effects of the invention according to the first aspect, when a customer enters the inside of the predetermined area, the customer passes through the entrance in the predetermined area. Therefore, the customer-congestion detecting means detects the number of passing customers, and the head-count calculating means calculates the number of passing people per unit time, thereby determining the congestion of customers in the predetermined area. Furthermore, when the number of passing people per unit time calculated by the head-count calculating means is equal to or greater than the predetermined head count, the first standby temperature is set. When the number of passing people is smaller than the predetermined head count, the second standby temperature is set. For example, if the number of passing people per unit time is equal to or greater than the predetermined head count, by setting the first standby temperature at a desired temperature thereby allowing the food materials to be quickly heated, the food materials can be heated and cooked even with a high congestion of customers. Furthermore, when the number of passing people per unit time is smaller than the predetermined head count, the second standby temperature lower than the first standby temperature is set, thereby reducing the energy consumed by the operation of the heating means.

DETAILED DESCRIPTION OF THE INVENTION

A fryer 1 according to one embodiment of the present invention is described below based on the drawings.

Figure 1:
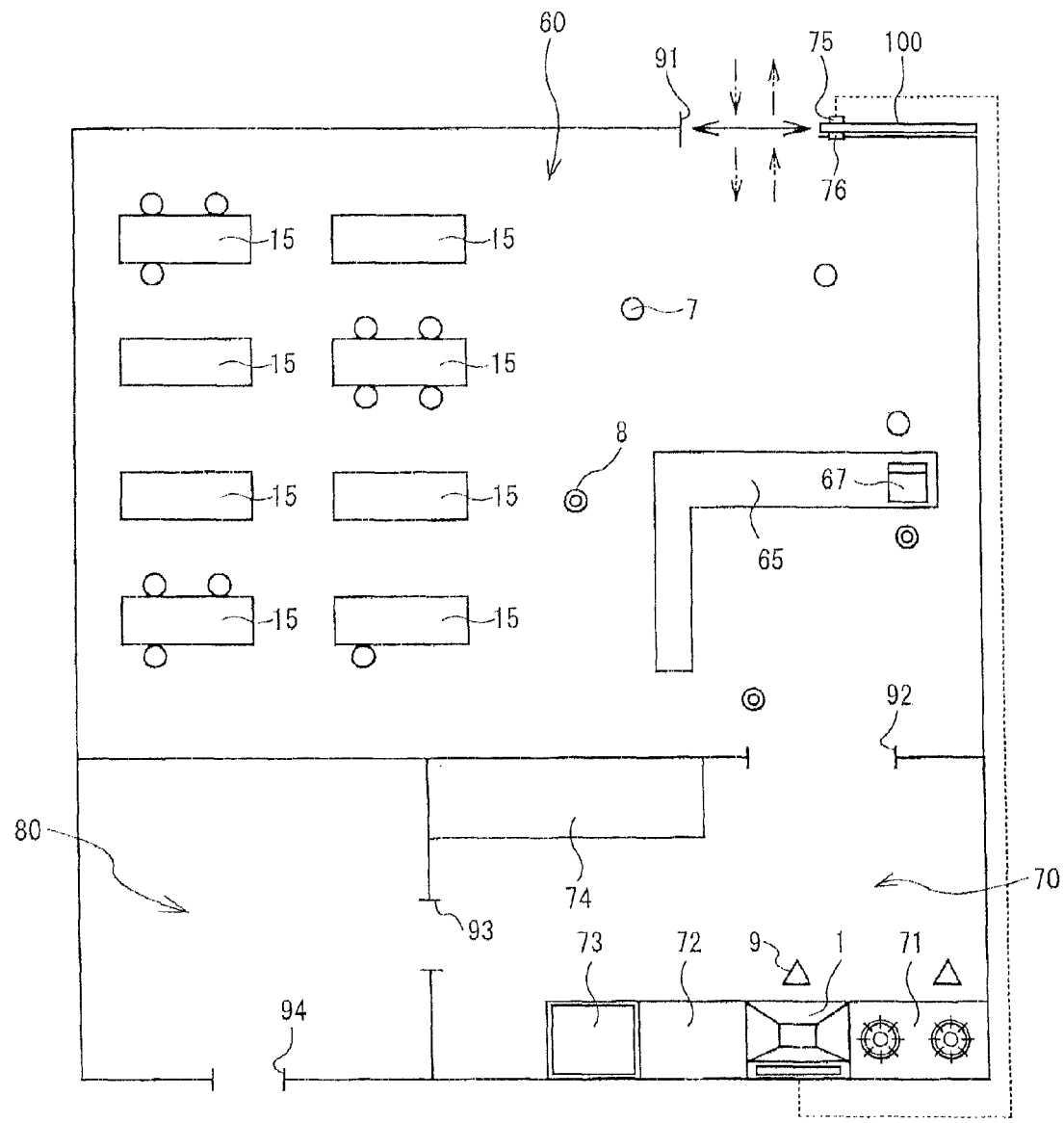
FIG. 1 is a layout diagram of the inside of a restaurant in which a fryer 1 is disposed in a cooking area 70.

The fryer 1 according to the present embodiment (refer to FIG. 2) is set up for use in the cooking area 70 of a restaurant or the like illustrated in FIG. 1, for example, and has a feature of the present invention in which a standby temperature of cooking oil can be switched according to the congestion of customers 7 in a hall 60 inside the restaurant. Here, it is assumed in the following description that "congestion of customers 7" means "a degree of congestion of customers 7 in the hall 60 inside the restaurant".

An example of an in-shop layout of the restaurant where the fryer 1 according to the present embodiment is set up is first described. As illustrated in FIG. 1, the inside of the restaurant is divided by partition walls into three areas: the hall 60, which is an area for customers 7 to eat and drink; the cooking area 70, which is an area for a cook 9 to cook food materials; and a storage area 80, which is an area for storing food materials and for others to use in the cooking area 70. A partition wall for partition between the hall 60 and the cooking area 70 is provided with an entrance/exit 92. A partition wall for partition between the cooking area 70 and the storage area 80 is provided with an entrance/exit 93. An outer wall of the storage area 80 is provided with an entrance/exit 94 for entrance and exit from and to the outside. Here, the hall 60 illustrated in FIG. 1 corresponds to a "predetermined area".

An outer wall surrounding the hall 60 is provided with an entrance/exit 91 for the customers 7 to enter and exit the hall 60. That entrance/exit 91 is provided with an automatic door 100 for slidably opening and closing the entrance/exit 91. Near the entrance/exit 91, a door driving device (not shown) for slidably opening and closing the automatic door 100 is provided. Furthermore, on an outer surface of the automatic door 100 faced to the outside of the restaurant, a touch-type entrance switch 75 for opening the automatic door 100 to enter the hall 60 from the entrance/exit 91 is mounted. On an inner surface opposite to the outer surface, a touch-type exit switch 76 for opening the automatic door 100 to exit to the outside from the entrance/exit 91 is mounted. Furthermore, on an upper portion of the entrance/exit 91, an infrared sensor (not shown) that detects the presence or absence of a person is provided.

The entrance switch 75, the exit switch 76, and the infrared sensor (not shown) are connected to the door driving device. Both the entrance switch 75 and the exit switch 76 output an ON signal for instruction of opening the automatic door 100 to the door driving device. Thus, upon recognizing the output signal, the door driving device causes the automatic door 100 to slide to open and close the entrance/exit 91. After a predetermined time elapses after the automatic door 100 slides to open the entrance/exit 91, the door is closed again. Even if a person who opened the automatic door 100 with the entrance switch 75 passes by, when the infrared sensor detects the presence of the person at the entrance/exit 91, the automatic door 100 is controlled so as not to be closed. Also, in the hall 60, a plurality of tables 15 and chairs (not shown) are disposed for customers 7 to eat and drink. At a place facing to the entrance/exit 91, a checkout counter 65 is disposed for checkout after the customers 7 eat and drink. On the checkout counter 65, a cash register 67 operated by a clerk 8 is placed.

On the other hand, the cooking area 70 has disposed therein a range table 71 supporting a pair of gas ranges, the fryer 1 according to the present embodiment, a working table 72, a sink 73 for washing dishes, food materials, others, and a working table 74. The fryer 1 set in this cooking area 70 can switch the standby temperature of cooking oil in an oil vessel 10 (refer to FIG. 2) of the fryer 1 between two standby temperatures T1 and T2 (degrees Celsius) according to the congestion of customers 7 in the hall 60. Furthermore, the fryer 1 detects, every predetermined time, the press count of the entrance switch 75 pressed when the customer 7 enters the hall 60 to know the congestion of customers 7 in the hall 60, thereby switching the standby temperature of the cooking oil appropriately. The configuration of this fryer 1 and the control operation by the control device 50 (refer to FIG. 3) are described below in sequence.

Figure 2:
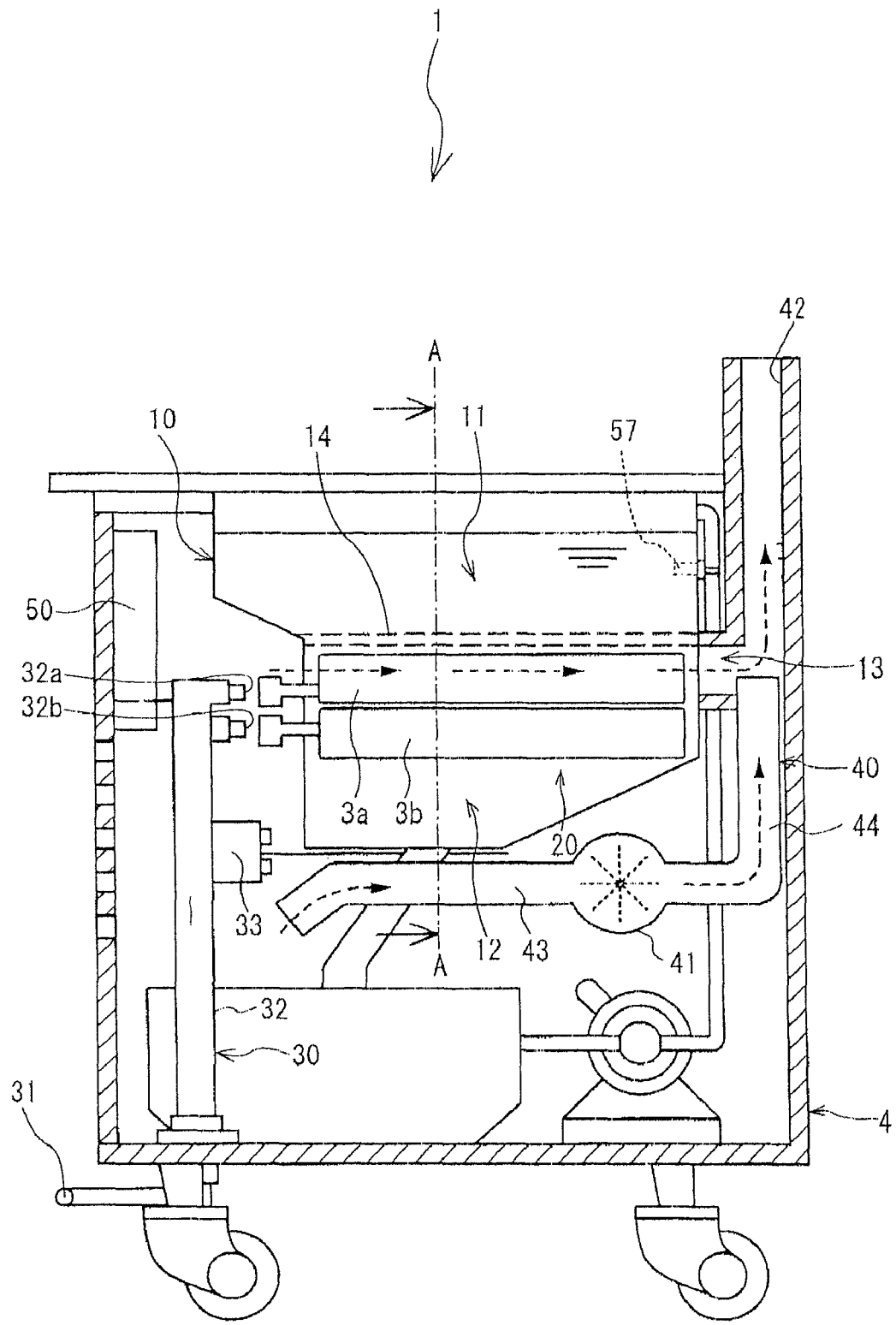
FIG. 2 is a cross-section view of the fryer 1.

Next, the configuration of the fryer 1 according to the present embodiment is schematically described. As illustrated in FIG. 2, the fryer 1 includes the oil vessel 10 that accommodates cooking oil for frying food materials, a heating device 20 provided horizontally on both sides of a lower portion of the oil vessel 10 to heat the cooking oil in the oil vessel 10, and a casing 4 that accommodates both of the oil vessel 10 and the heating device 20 for protection.

Figure 3:
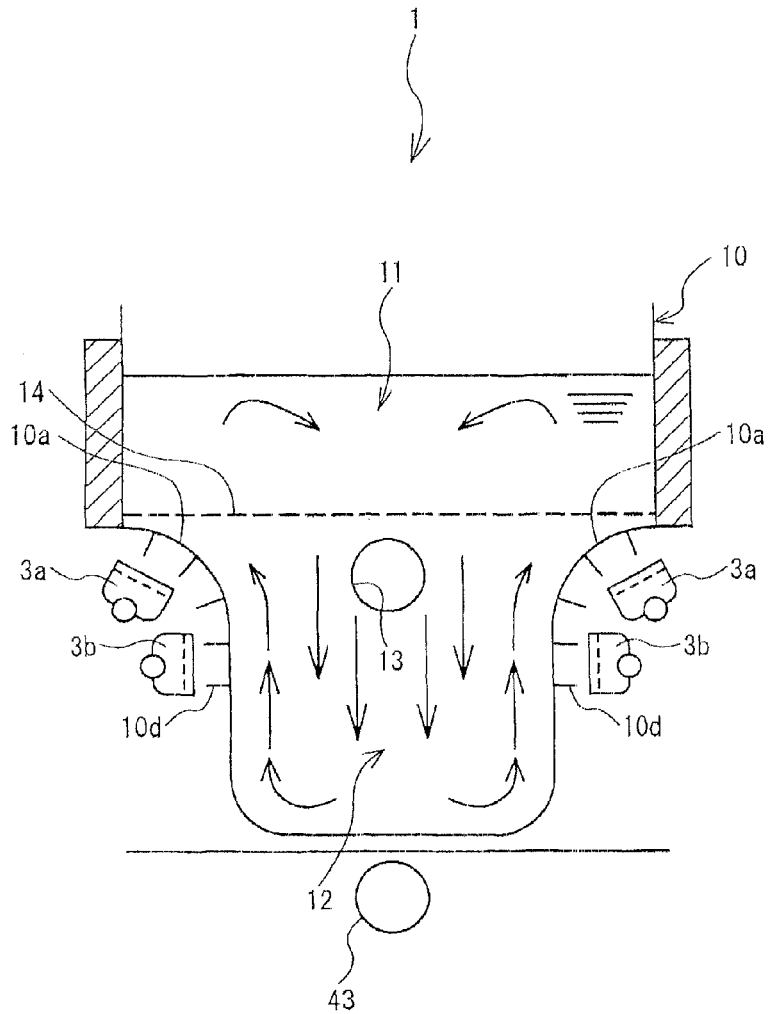
FIG. 3 is a cross-section view in an A-A line viewed from an arrow-indicated direction illustrated in FIG. 2.

Next, the oil vessel 10 is described. As illustrated in FIGS. 2 and 3, the oil vessel 10 has a mortar shape that is recessed inwardly from a middle-stage portion in a vertical direction to a bottom portion. Horizontally on both sides of the middle-stage portion, a pair of tilted surfaces 10*a* are provided and bent smoothly toward the bottom portion. Furthermore, in the oil vessel 10, a metal net 14 is horizontally disposed above the tilted surfaces 10*a*. Above the net 14, a cooking zone 11 is formed in which food materials are introduced. Below the net 14, a cold zone 12 is formed into which convecting low-temperature cooking oil flows. Here, the oil vessel 10 illustrated in FIG. 2 corresponds to a "cooking vessel".

At an upper portion of the cold zone 12, an exhaust path 13 penetrating through the side surfaces of the oil vessel 10 in a longitudinal direction is provided through which the exhaust from the heating device 20 passes. Furthermore, on each of outer surfaces of the pair of the tilted surfaces 10*a* of the oil vessel 10, several fins 10*d* extending in the longitudinal direction of the oil vessel 10 are provided. On the other hand, on an upper back surface side in the oil vessel 10, a temperature sensor 57 that measures an oil temperature in the cooking zone 11 is set up. The temperature sensor 57 is connected to the control device 50 of the heating device 20. Here, the temperature sensor 57 illustrated in FIG. 2 corresponds to a "temperature detecting means".

Next, the heating device 20 is described. As illustrated in FIGS. 2 and 3, the heating device 20 includes burners 3*a* and 3*b* provided near each outer surface of the pair of the tilted surfaces 10*a* for heating the tilted surfaces 10*a* with radiation heat (radiant heat), a fuel-gas supplying unit 30 that supplies fuel gas to the burners 3*a* and 3*b*, a supply and exhaust unit 40 that supplies combustion air to the burner 3*a* and 3*b*, and the control device 50 for combustion by the burners 3*a* and 3*b* and temperature control of the oil vessel 10, and the like. Here, the burners 3*a* and 3*b* illustrated in FIG. 2 correspond to a "heating means".

The burners 3*a* and 3*b* are described. As illustrated in FIGS. 2 and 3, the burners 3*a* and 3*b* are provided vertically in two lines along each outer surface of the pair of tilted surfaces 10*a*. These burners 3*a* and 3*b* are all primary air burners for performing all primary combustion on a plate surface of a ceramic plate provided with many burner ports.

The fuel-gas supplying unit 30 is described. As illustrated in FIGS. 2 and 3, the fuel-gas supplying unit 30 includes a gas entrance 31 provided on the bottom portion of the casing 4, a gas supply pipe 32 connected to the gas entrance 31 to supply fuel gas flowing from the gas entrance 31 to the burners 3*a* and 3*b*, a gas solenoid valve 33 provided to the gas supply pipe 32 to adjust the amount of fuel gas to be supplied to the burners 3*a* and 3*b* by opening and closing a gas flow path in the pipe, and nozzles 32*a* and 32*b* provided on a downstream side of the gas supply pipe 32 to eject fuel gas to the burners 3*a* and 3*b*. With this configuration, fuel gas is supplied to the burners 3*a* and 3*b*. From a space between the nozzles 32*a* and 32*b* and the burners 3*a* and 3*b*, primary combustion air is aspirated.

The supply and exhaust unit 40 is described. As illustrated in FIG. 2, the supply and exhaust unit 40 includes an exhaust pipe 42 extended upward from the upper back surface side of the casing 4 to discharge air of the heating device 20 to the outside, a first air supply pipe 43 provided at a lower portion of the oil vessel 10, a fan 41 provided on the downstream side where air from the first air supply pipe 43 flows for taking air in the first air supply pipe 43, and a second air supply pipe 44 connected to a downstream side of the fan 41 for flowing air from the exhaust path 13 toward the exhaust pipe 42 by the flow of air taken in the fan 41.

Figure 4:
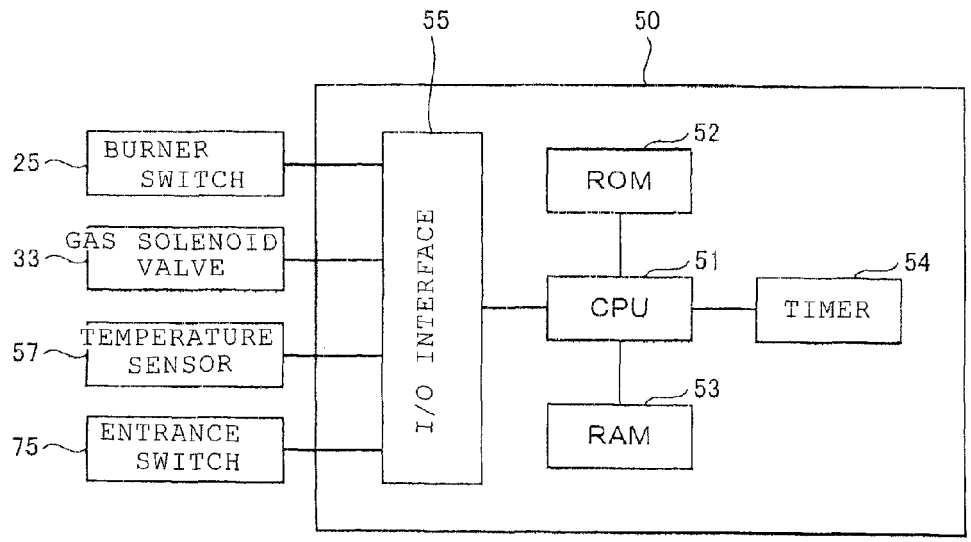
FIG. 4 is a block diagram illustrating the configuration of a control device 50.

Next, the control device 50 is described. The control device 50 illustrated in FIG. 2 opens and closes the gas solenoid valve 33 so as to keep the oil temperature within a predetermined range based on the detection signal of the temperature sensor 57, thereby adjusting combustion of the burners 3a and 3b. As illustrated in FIG. 4, the control device 50 includes a CPU 51 having a known arithmetic logical operation circuit. The CPU 51 has connected thereto a ROM 52 having stored therein various control programs and control data, a RAM 53 that temporarily stores information, a timer 54, and an I/O interface 55 for data input/output. Furthermore, the I/O interface 55 has connected thereto a burner switch 25 for igniting and extinguishing fires of the burners 3a and 3b, the gas solenoid valve 33, the temperature sensor 57, and the entrance switch 75 of the automatic door 100.

In this manner, an ON/OFF signal for an igniting or extinguishing instruction for the burner switch 25 is input to the CPU 51. Therefore, based on the ON/OFF signal, the CPU 51 controls an igniting and extinguishing operation of the burners 3a and 3b. Also, since the detection signal of the oil temperature detected by the temperature sensor 57 is input to the CPU 51, the CPU 51 adjusts combustion of the burners 3a and 3b so as to maintain the current oil temperature within a predetermined range by controlling opening and closing of the gas solenoid valve 33. Furthermore, since an ON signal of the entrance switch 75 is input to the CPU 51, the CPU 51 counts the press count of the entrance switch 75 when the customers 7 enter the hall 60 based on the ON signal of this switch to determine the congestion of customers 7.

Figure 5:
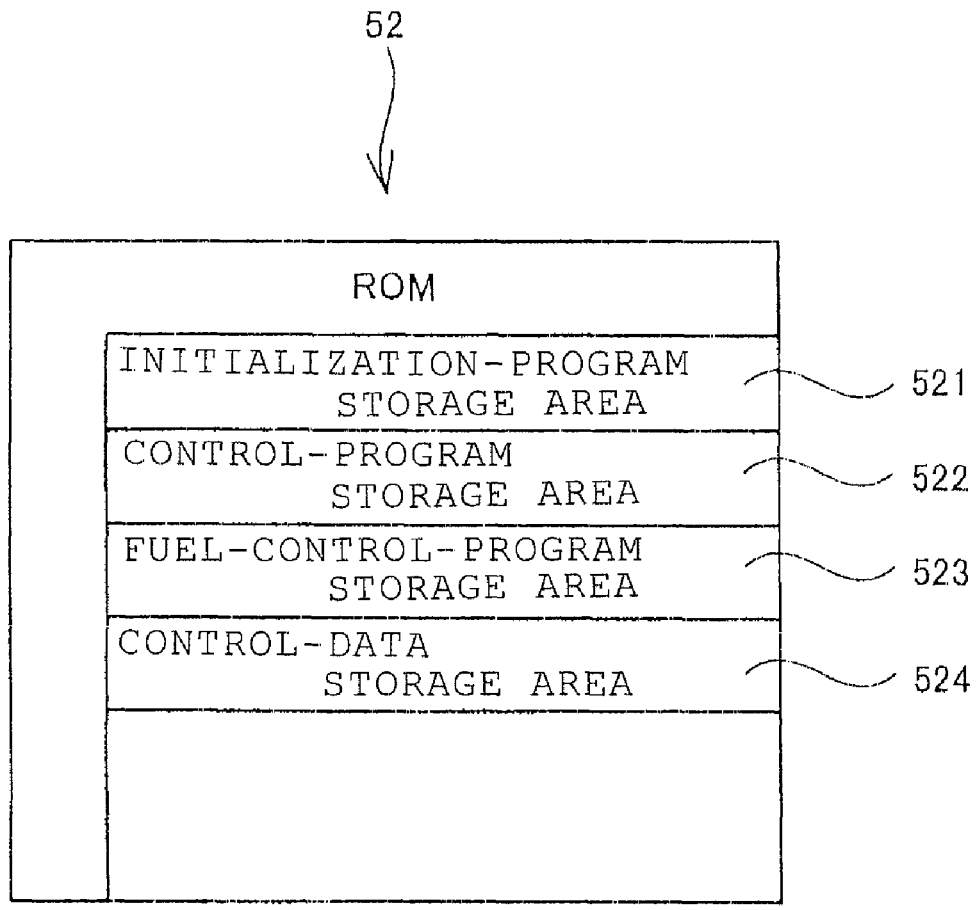
FIG. 5 is a conceptual diagram illustrating storage areas of a ROM 52.
Figure 6:
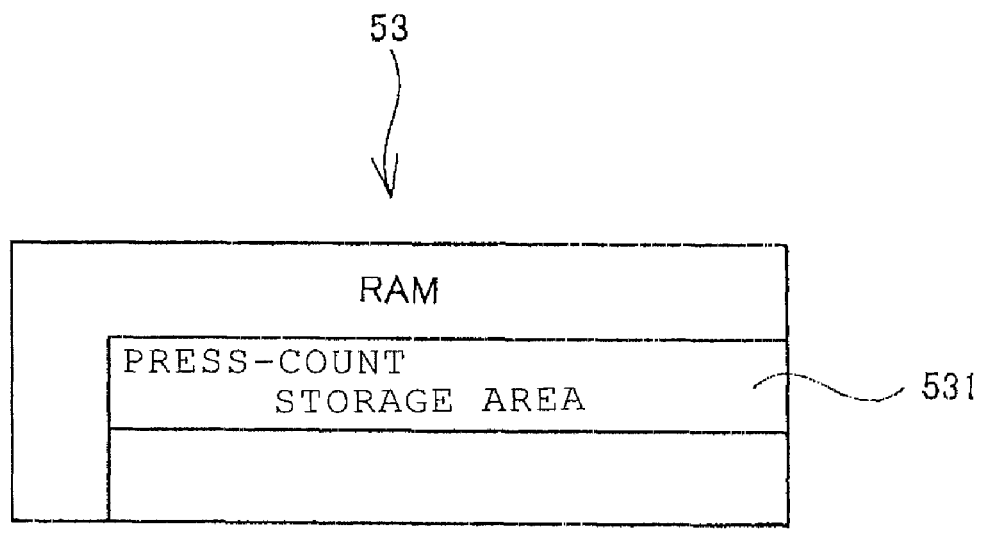
FIG. 6 is a conceptual diagram illustrating storage areas of a RAM 53.

Next, the ROM 52 and the RAM 53 are described. As illustrated in FIG. 5, the ROM 52 includes, for example, areas for various control programs, such as an initialization-program storage area 521 that stores an initialization program for initialization, a control-program storage area 522 that stores a main control program for the fryer 1, and a fuel-control-program storage area 523 that stores a fuel control program for controlling the amount of supply of fuel gas to the burners 3a and 3b, and also a control-data storage area 524 that stores various control data. On the other hand, the RAM 53 is provided with, for example, a press-count storage area 531 that stores the press count of the entrance switch 75 per unit time, as illustrated in FIG. 6.

Next, a method of detecting congestion of customers 7 in the hall 60 is described. As illustrated in FIG. 1, the hall 60 in the restaurant where the fryer 1 according to the present embodiment is set up and provided with one entrance/exit 91 serving as both an entrance and an exit. Thus, if the number of times of opening and closing of the automatic door 100 by which the entrance/exit 91 is opened and closed is counted, the number of times will be a total of the number of times of the opening and closing of the automatic door 100 for entering as well as exiting the hall 60. However, since a customer 7 presses the entrance switch 75 of the automatic door 100 when he enters the hall 60, by detecting an ON signal of the entrance switch 75 for counting the press count of the entrance switch 75, the opening and closing count of the automatic door 100 when customers 7 enter the hall 60 can be indirectly counted. Then, the press count of the entrance switch 75 is counted per unit time (for example, ten minutes) and, when the count number is equal to or greater than a predetermined count (p1 times), it is determined that the congestion of customers 7 is high. On the other hand, when the count number is smaller than the predetermined count (p1 times), it can be determined that the congestion of customers 7 is low. Here, evaluation criteria of the congestion of customers 7 can be preferably determined from the number of people that can be accommodated in the hall 60, data of variation in the degree of crowdedness of customers 7 per day, season, day of the week, and others.

Here, the fryer 1 according to the present embodiment is setup in a restaurant with the automatic door 100 that is opened and closed by pressing the entrance switch 75 and the exit switch 76. Other than that, there are various types of automatic doors. An example of an automatic door is one that has a door opening that uses an infrared sensor to detect the passage of a human through infrared rays emitted from the infrared sensor. There is also an automatic door opening that uses a pressure-sensitive sensor in a floor mat spread at the entrance/exit 91 thereby detecting the weight of a human with the pressure-sensitive sensor. That is, the method of detecting the congestion of customers 7 is varied depending on the type of the automatic door as described above. In the case of the former type, for example, an infrared sensor is mounted on each of the outside and inside of the automatic door, and the outside infrared sensor to detect the entrance to the hall 60 is connected to the control device 50. Thus, the opening and closing count of the automatic door 100 at the time of entrance to the hall 60 can be counted.

On the other hand, in the case of the latter type, for example, two pressure-sensitive sensors are set up, one being at a portion of a floor mat (not shown) at the entrance/exit 91 positioned outside of the automatic door and the other being at a portion thereon positioned inside thereof, and only the outside pressure-sensitive sensor to detect the entrance to the hall 60 is connected to the control device 50. Thus, the opening and closing count of the automatic door 100 at the time of entrance to the hall 60 can be counted.

Also, in the case of a restaurant with a hall provided with an entrance and an exit separately, for example, the number of times of opening and closing of an automatic door on the entrance side can be counted. In this case, a door driving device can be connected to the control device 50 to count the number of times of opening and closing of the automatic door at the entrance per unit time occurs.

Next, the standby temperature of the cooking oil in the oil vessel 10 is described. The cooking oil in the oil vessel 10, illustrated in FIG. 2, is kept at a predetermined standby temperature by the heating device 20 in order to quickly heat and cook food materials according to orders from customers 7. Here, in the fryer 1 according to the present embodiment, switching can be made to either one of two standby temperatures T1 and T2 (degrees Celsius) according to the congestion of customers 7 in the hall 60. For example, when the opening and closing count per unit time, which is detected by the entrance switch 75 of the automatic door 100, is equal to or greater than p1 times, it is determined that the congestion of customers 7 is high, and therefore the standby temperature T1 (degrees Celsius) is set. This T1 (degrees Celsius) standby temperature is set at a high temperature allowing food materials to be quickly fried. Thus, even if the amount of food materials introduced to the fryer 1 is increased as the hall 60 is crowded with customers 7, heat cooking can still be quickly performed.

On the other hand, if the press count of the entrance switch 75 per unit time is smaller than p1 times, it is determined that the congestion of customers 7 is low, and therefore the standby temperature T2 (degrees Celsius) is set. This T2 (degrees Celsius) standby temperature is set at a lower temperature than T1 (degrees Celsius) standby temperature. Thus, fuel gas consumed by the burners 3a and 3b can be saved, thereby increasing energy efficiency and saving the cost required for the operation of the fryer 1. Furthermore, the exhaust gas from the burners 3a and 3b can also be reduced.

Next, the main control operation of the fryer 1 by the CPU 51 is described with reference to the flowcharts from FIGS. 7 to 9. First, when a start switch (not shown) of the fryer 1 is turned ON, the initialization program is read for initialization. It is then determined whether the burner switch 25 of the fryer 1 has been turned ON (S11). If it is determined herein that the burner switch 25 has not been turned ON ("NO" at S11), the procedure returns to S11 to continue monitoring whether the burner switch 25 has been turned ON. If it is determined that the burner switch 25 has been turned ON ("YES" at S11), the gas solenoid valve 33 is open, thereby fuel gas is supplied from the nozzles 32a and 32b to the burners 3a and 3b and igniting the burners 3a and 3b by an igniting device (not shown) (S12).

Then, as illustrated in FIG. 2, when fuel gas is supplied from the nozzles 32a and 32b to the burners 3a and 3b, primary air for combustion is aspirated from a space between the nozzles 32a and 32b and the burners 3a and 3b, thereby keeping a good burning state of the burners 3a and 3b. Also, radiation heat from the burners 3a and 3b is radiated to the tilted surfaces 10a and the fins 10d of the oil vessel 10. Thus, in the oil vessel 10 receiving radiation heat, heat exchange with the inner cooking oil occurs via the tilted surfaces 10a. On the other hand, the exhaust gas produced at the burners 3a and 3b flows into the exhaust pipe 42 from rear on the left and right sides of the oil vessel 10. Also, part of the exhaust gas flows into the exhaust pipe 42 via the exhaust path 13 penetrating through the center portion of the oil vessel 10. Since thermal exchange with the cooking oil occurs also in the exhaust path 13, high thermal efficiency can be achieved. In the supply and exhaust unit 40, the fan 41 is operated to take air in the first air supply pipe 43 and the second air supply pipe 44 from outside. With taken-in air, the exhaust flowing from the exhaust path 13 is emitted via the exhaust pipe 42.

Next, in order to detect the congestion of customers 7 in the hall 60, a customer-congestion detecting process is performed (S13). In this customer-congestion detecting process, as described above, the press count of the entrance switch 75 of the automatic door 100 per unit time is counted. The customer-congestion detecting process will be described further below. Then, when the customer-congestion detecting process is completed, a temperature setting process is performed based on the congestion of customers 7 detected in the customer-congestion detecting process (S14). In this temperature setting process, as described above, the standby temperature of the cooking oil in the oil vessel 10 is set based on the press count of the entrance switch 75 per unit time detected in the customer-congestion detecting process. The temperature setting process will be described further below. Then, when the temperature setting process is completed, a heating operation of the heating device 20 is controlled so that the oil temperature of the cooking oil in the oil vessel 10 is at the standby temperature set in the temperature setting process (S15). Thus, the standby temperature of the oil vessel 10 can be appropriately adjusted according to the congestion of customers 7 in the hall 60.

Next, it is determined whether the burner switch 25 has been turned OFF (S16). If it is determined that the burner switch 25 has not yet been turned OFF ("NO" at S16), the procedure returns to S13 to again perform the customer-congestion detecting process, thereby controlling the oil temperature in the oil vessel 10 at the standby temperature according to the congestion of customers 7. Then, if it is determined that the burner switch 25 has been turned OFF ("YES" at S16), the gas solenoid valve 33 is closed, thereby stopping the supply of fuel gas from the nozzles 32a and 32b to the burners 3a and 3b to extinguish fires of the burners 3a and 3b (S17). The procedure then returns to S11 to repeat a series of processes.

Next, the customer-congestion detecting process (S13) is described. As illustrated in FIG. 8, a press-count counter p of the automatic door 100 is first reset (S21). Next, the timer 54 is reset (S22) to start. Furthermore, it is determined whether the entrance switch 75 has been pressed (S23). If it is determined that the entrance switch 75 has been pressed ("YES" at S23), the press-count counter p is incremented by 1 (S24). Then, it is determined whether a unit time (for example, ten minutes) has elapsed (S25). If it is determined that the unit time has not yet elapsed ("NO" at S25), the procedure returns to S23 to continue determining the presence or absence of pressing of the entrance switch 75. If it is determined that the entrance switch 75 has not been pressed ("NO" at S23), the press-count counter p is not incremented by 1, and it is again determined whether the unit time has elapsed (S25).

Then, if it is determined that the unit time has elapsed ("YES" at S25), the value of the press-count counter p at this time is stored in the press-count storage area 531 on the RAM 53 (S26). If the previous press count is stored in this press-count storage area 531, the count is rewritten with the press count this time.

Next, it is determined whether the burner switch 25 has been turned OFF (S27). If it is determined that the burner switch 25 has not yet been turned OFF ("NO" at S27); the procedure goes to the temperature setting process (refer to FIGS. 7 and 9). On the other hand, if it is determined that the burner switch 25 has been turned OFF ("YES" at S27), the procedure goes to S17 illustrated in FIG. 7, thereby extinguishing fires of the burners 3a and 3b.

Next, the temperature setting process is described. As illustrated in FIG. 9, it is first determined whether the value of the press-count counter p stored in the press-count storage area 531 on the RAM 53 is equal to or greater than p1 (S31). If it is determined that the value of the press-count counter p is equal to or greater than p1 ("YES" at S31), it is estimated that the congestion of customers 7 in the hall 60 is high. Therefore, the standby temperature T1 (degrees Celsius) allowing food materials introduced into the oil vessel 10 to be quickly fried is set (S33). Then, the heating device 20 makes an adjustment so that the oil temperature in the oil vessel 10 is at T1 (degrees Celsius). Thus, even if the number of customers 7 staying in the hall 60 is large increasing the number of orders for food, cooking and heating can be quickly performed.

If it is determined that the value of the press-count counter p stored in the press-count storage area 531 on the RAM 53 is smaller than p1 ("NO" at S31), it is estimated that the congestion of customers 7 in the hall 60 is low. Therefore, the amount of food materials introduced to the oil vessel 10 becomes small. Thus, if the oil temperature is kept at the standby temperature T1 (degrees Celsius), it would be a waste of combustion gas for use at the burners 3a and 3b. Therefore, the standby temperature T2 (degrees Celsius) which is lower than the standby temperature T1 is set (S32). Then, the heating device 20 is controlled to adjust the oil temperature in the oil vessel 10 at T2 (degrees Celsius). Thus, combustion gas is not wastefully consumed at the burners 3a and 3b, and combustion gas can be saved. Also, if the number of customers 7 is small, the exhaust gas is reduced, which is also environmentally preferable.

Figure 7:
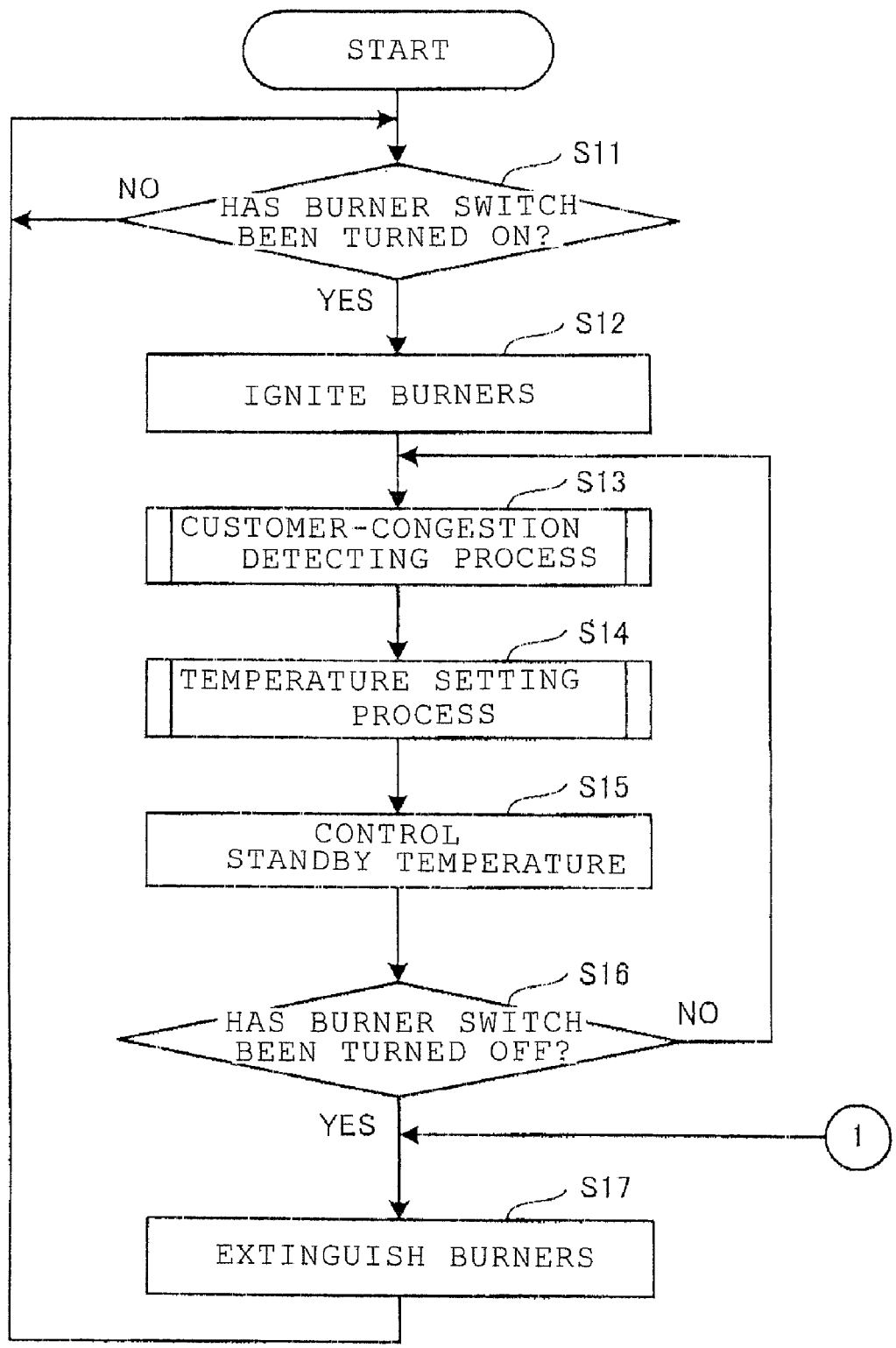
FIG. 7 is a flowchart of a main control operation by a CPU 51.
Figure 8:
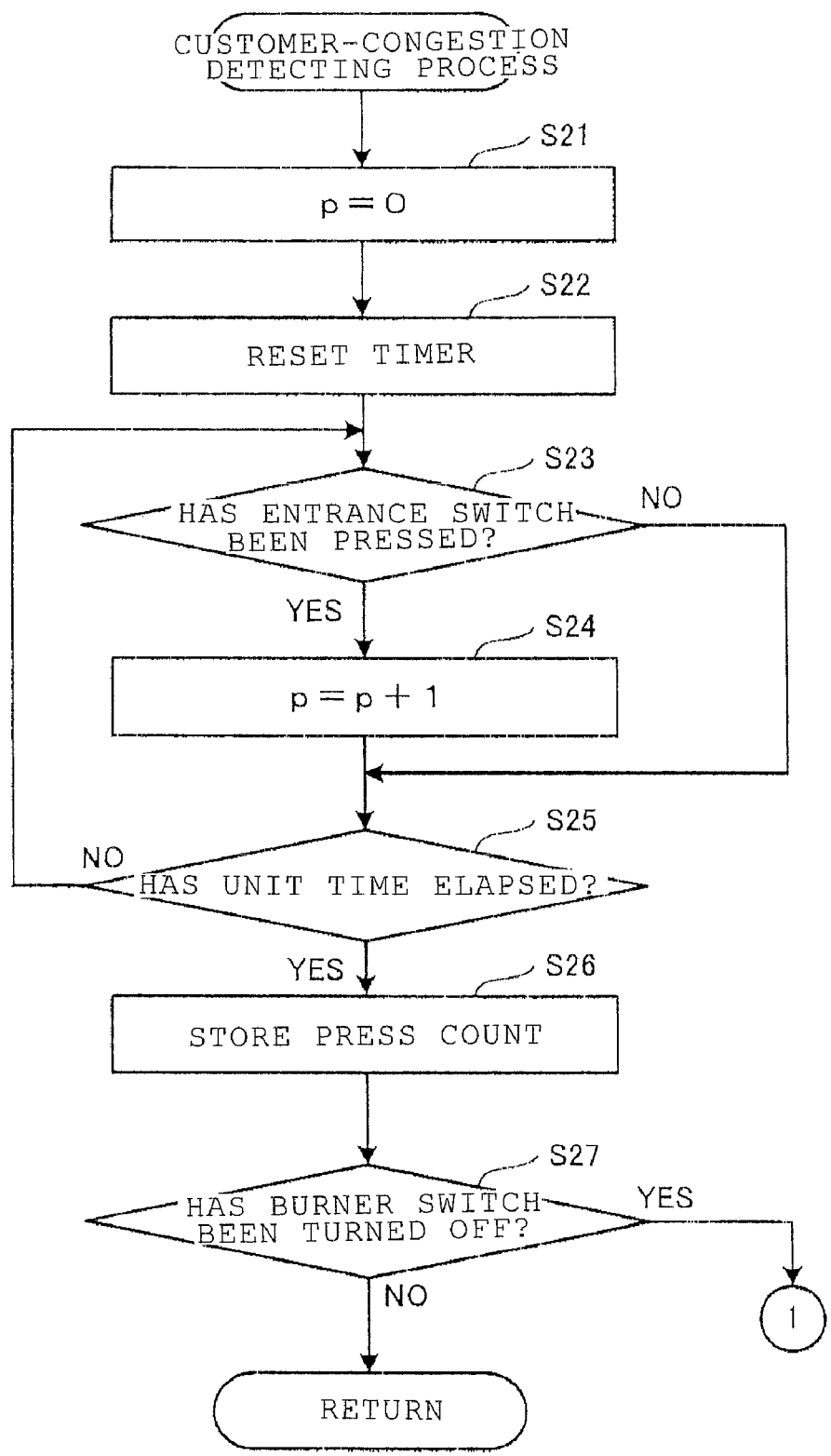
FIG. 8 is a flowchart of a customer-congestion detecting process.
Figure 9:
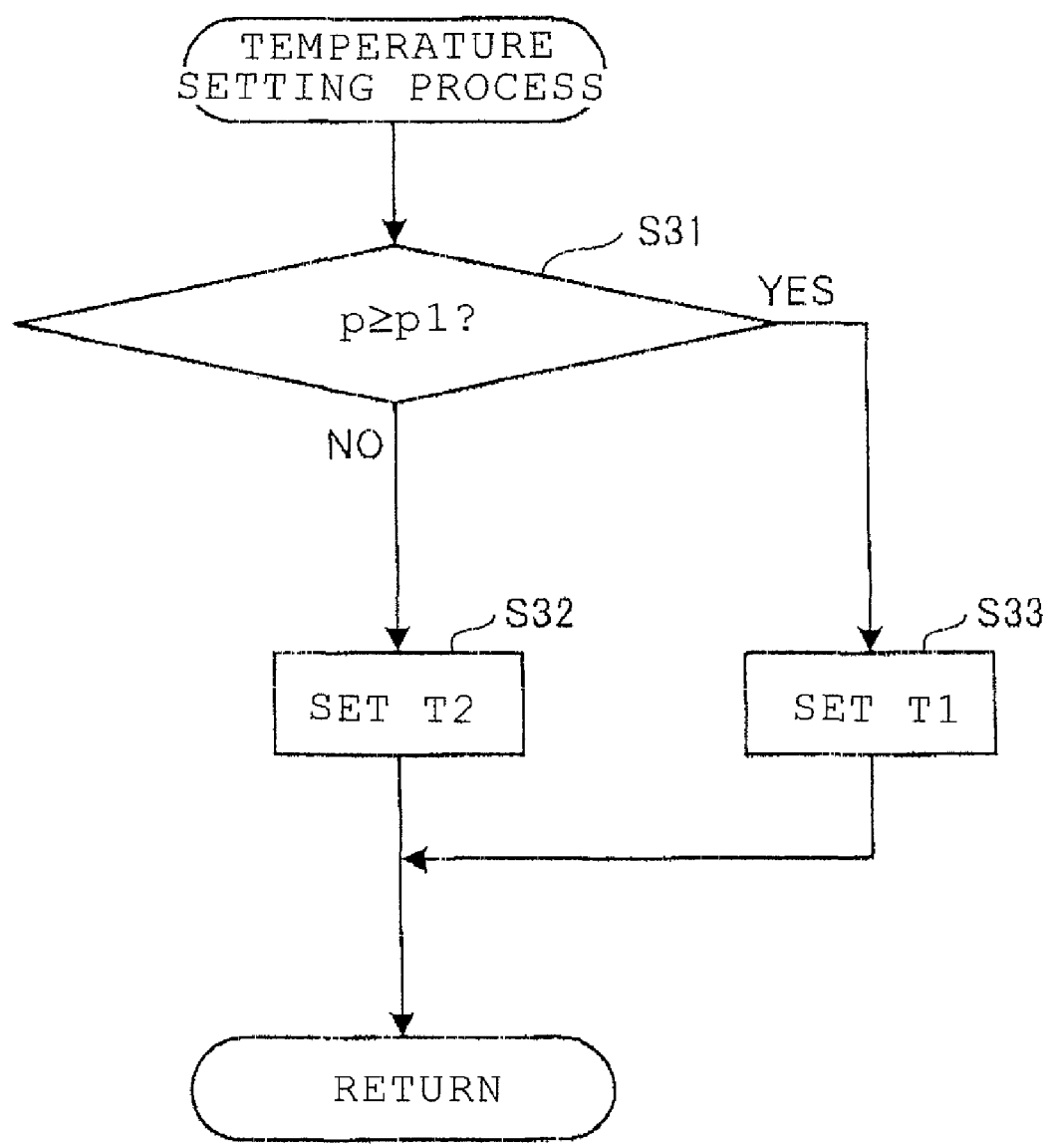
FIG. 9 is a flowchart of a temperature setting process.

Here, in the above description, the CPU 51 performing the process at S13 illustrated in FIG. 7 corresponds to a "customer-congestion detecting means", the CPU 51 performing the process at S15 corresponds to a "heat controlling means", the CPU 51 performing the processes at S22 to S26 illustrated in FIG. 8 corresponds to a "press-count calculating means", and the CPU 51 performing the processes at S31, S32, and S33 illustrated in FIG. 9 corresponds to a "temperature setting means".

As has been described in the foregoing, the fryer 1 according to the present embodiment is set up and used in the cooking area 70 of a restaurant or the like and the standby temperatures of the cooking oil in the fryer can be switched according to the congestion of customers 7 in the hall 60 in the restaurant. As for the congestion of customers 7, the congestion of customers 7 can be relatively evaluated per unit time when the press count of the entrance switch 75, which is pressed when a customer 7 enters the hall 60, is counted per unit time (for example, ten minutes). For example, if the count number per unit time is equal to or greater than a predetermined count (p1 times), it can be determined that the congestion of customers 7 is high. If the count number is smaller than the predetermined count (p1 times), it can then be determined that the congestion of customers 7 is low.

Thus, if the press count is equal to or greater than p1, the standby temperature T1 (degrees Celsius) allowing food materials introduced into the oil vessel 10 to be quickly fried is set. Thus, even if the number of customers 7 staying in the hall 60 is large increasing the number of orders for food, heat cooking can still be quickly performed. On the other hand, if the press count is smaller than p1, the standby temperature T2 (degrees Celsius) lower than the standby temperature T1 is set. Thus, combustion gas is not wastefully consumed at the burners 3a and 3b, and saved. Also, if the number of customers 7 is small, the exhaust gas can be reduced, which is also environmentally preferable.

Here, needless to say, the present invention is not restricted to the above embodiment and can be variously modified. In the above embodiment, the congestion of customers 7 is determined by detecting the press count of the entrance switch 75 of the automatic door 100 per unit time. Alternatively, for example, an infrared sensor may be provided at the entrance/exit 91 to detect the number of customers 7 passing through the entrance/exit 91 per unit time. In this case, at the entrance/exit 91, entering customers 7 and exiting customers 7 are both counted. To deal with this, for example, a first infrared sensor is provided outside of the entrance/exit 7 and a second infrared sensor is provided on the hall 60 side of the entrance/exit 91, counting is performed only when the first infrared sensor detects passage of a customer 7 and then the second infrared sensor detects passage, thereby detecting the congestion of customers 7.

Also, the number of customers 7 staying in the hall 60 may be directly counted. For example, a human-sensitive sensor may be mounted at a predetermined position in the hall 60 to detect the number of customers 7 in the hall 60 at predetermined intervals and then according to the detection result, the standby temperatures in the oil vessel 10 of the fryer 1 may be switched. Furthermore, a temperature and humidity sensor capable of detecting both the temperature and humidity may be mounted in the hall 60 and, based on the temperature and humidity in the hall 60, the standby temperatures in the oil vessel 10 may be switched. In this case, as the congestion of customers 7 in the hall 60 is increased, the temperature and humidity in the hall 60 tends also to be increased due to heat from the customers 7. Therefore, by detecting the temperature and humidity in the hall 60, the congestion of customers 7 can be indirectly detected.

Furthermore, the number of operations performed at the cash register 67 placed on the checkout counter 65 in the hall 60 may be counted per unit time to detect the congestion of customers 7. Still further, the number of operations taken by an ordering device (not shown) per unit time carried by the clerk 8 in charge of the hall 60 (for example, the number of times of transmission of order data to a server) may be counted. This ordering device is used by the clerk 8 to receive an order from a customer 7 waiting at the table 15 and transmits the order to a server disposed in the cooking area 70, and the working staff does the cooking according to the menu of the order sent to the server. Thus, by counting the orders sent to the server per unit time, the congest ion of customers 7 can be indirectly detected.

The standby temperatures described in the above embodiment are merely an example and, needless to say, the present invention is not restricted to these numerical values. Furthermore, in the above embodiment, two oil temperatures T1 and T2 are set as standby temperatures in the oil vessel 10, but the number of temperatures may be three or more. In that case, a plurality of numerical-value ranges of the press count of the entrance switch 75 per unit time can be set, with a standby temperature being set for each of the numerical-value ranges. Still further, "equal to or greater than" and "smaller than" in the predetermined count as a criterion may be construed as being reversed to those in the example of the above embodiment.

According to the present invention, a liquid heat-cooking device can be used as a fryer or a noodle boiling machine and the like for heating and cooking food materials with heated liquid, such as oil or water.

What is claimed is:

1. A liquid heat-cooking device comprising:
   a cooking vessel that accommodates liquid;
   a heating means that heats the liquid in the cooking vessel;
   a temperature detecting means that detects a temperature of the liquid;
   a customer-congestion detecting means that detects customer congestion in a predetermined area;
   a temperature setting means that sets a standby temperature of the liquid according to a detection result of the customer-congestion detecting means; and
   a heat controlling means that controls an operation of the heating means so that the liquid is at the standby temperature set by the temperature setting means, wherein
   the temperature setting means,
   sets a first standby temperature when the detection result of the customer-congestion detecting means indicates a value equal to or greater than a predetermined value, and
   sets a second standby temperature lower than the first standby temperature when the detection result of the customer-congestion detecting means indicates a value smaller than the predetermined value.

2. The liquid heat-cooking device according to claim 1, wherein
   the customer-congestion detecting means includes a press-count calculating means that detects a press of a switch for opening and closing a door at an entrance of the predetermined area and calculates the press count per unit time, and
   the temperature setting means,
   sets the first standby temperature when the press count per the unit time calculated by the press-count calculating means is equal to or greater than a predetermined count, and sets the second standby temperature when the press count is smaller than the predetermined count.

3. The liquid heat-cooking device according to claim 1, wherein
   the customer-congestion detecting means includes an opening/closing-count calculating means that detects an opening/closing count of a door at an entrance of the predetermined area and calculates an opening/closing count of the door per unit time, and the temperature setting means, sets the first standby temperature when the opening/closing count of the door per the unit time calculated by the opening/closing-count calculating means is equal to or greater than a predetermined count, and sets the second standby temperature when the opening/closing count is smaller than the predetermined count.

4. The liquid heat-cooking device according to claim 1, wherein the customer-congestion detecting means includes a head-count calculating means that detects the number of people passing through an entrance of the predetermined area and calculates the number of passing people per unit time, and the temperature setting means, sets the first standby temperature when the number of passing people per the unit time calculated by the head-count calculating means is equal to or greater than a predetermined head count, and sets the second standby temperature when the number of passing people is smaller than the predetermined head count.

* * * * *